United States Patent [19]

Currah, Jr.

[11] 4,451,199
[45] May 29, 1984

[54] WIND DRIVEN POWER PLANT-STRUCTURAL SUPPORT

[76] Inventor: Walter E. Currah, Jr., 44 S. 64th St., Tacoma, Wash. 98409

[21] Appl. No.: 204,810

[22] Filed: Nov. 7, 1980

Related U.S. Application Data

[63] Continuation of Ser. No. 28,685, Apr. 10, 1979, abandoned.

[51] Int. Cl.³ .............................................. F03D 1/04
[52] U.S. Cl. .................................................. 415/2 A
[58] Field of Search ................. 52/245, 660; 415/2 A, 415/2 R, 3 A, 219 R

[56] References Cited

U.S. PATENT DOCUMENTS 4,073,101  2/1978  Yoshida ............................ 52/245 X
4,182,594  1/1980  Harper et al. ...................... 415/2 A

FOREIGN PATENT DOCUMENTS 119266  9/1918  United Kingdom ............... 415/2 A

Primary Examiner—Philip R. Coe
Assistant Examiner—Arthur D. Dahlberg
Attorney, Agent, or Firm—Ziems, Walter & Shannon

[57] ABSTRACT

A structural support system for a wind driven power plant includes a plurality of circular support frames that are supported relative to a stationary foundation by support columns. The support frames are mounted coincident with and spaced along a support-system longitudinal axis with each frame having a circular inner and a circular outer support ring. Axially directed stringers are connected to and extend between respective inner and outer support rings with associated stiffners to provide a structurally enhanced framework for supporting wind driven power plants. The support columns are preferably hinged to the foundation to permit the columns to be fabricated at ground level and pivoted into an upright position for connection to the associated support frames to provide the completed structure.

7 Claims, 8 Drawing Figures

WIND DRIVEN POWER PLANT-STRUCTURAL SUPPORT

This is a continuation of application Ser. No. 28,685, filed Apr. 10, 1979, now abandoned.

BACKGROUND OF THE INVENTION

The present invention relates to structural supports, and, more particularly, to structural supports for wind driven power plants.

On Apr. 28, 1978 the present inventor filed a related patent application at the U.S. Patent and Trademark Office for a "WIND DRIVEN POWER PLANT," this application issuing on Oct. 25, 1983 as U.S. Pat. No. 4,411,588. During the summer of 1978 the present applicant designed, tested, and evaluated the performance of the first power plant. The present invention is directed to a structural support system suitable for accommodating the structural features of the afore-mentioned wind driven power plant.

Equations for power and stress were derived from the performance data and theory. Computer programs for several power plant configurations were written, and power over mass ratios were computer generated. High power over mass ratios can be obtained in the design of the structural members.

The computer analysis showed that higher power over mass ratios can be obtained if columns and circular frames are constructed from bolted or riveted structural members, not welded. The computer analysis also showed that if the circular frame with the smallest outside diameter were to absorb the strain due to the thrust of the wind against the power plant walls and turbine blades, higher power over mass ratios would result.

The computer analysis showed that if loads, due to the thrust of the wind against the walls of the liners and fin, are transfered to the stiffeners, higher power over mass ratios will be obtained. The stiffeners would then transfer the loads to the stringers, the stringers to the frames, the frames to the columns, the columns to the foundation, and the foundation to the ground. Wind loads parallel to the turbine's axis of rotation will be distributed to the smallest circular frame, but loads perpindicular to the axis of rotation will be distributed to all of the circular frames. The smallest circular frame and its columns will be constructed much more ridgedly than the other circular frames, thereby absorbing more of the strain.

SUMMARY OF THE INVENTION

The projected difficulty in the construction of an economically feasible power plant such as the Currah wind driven power plant stems from the physical size. The construction costs of wind driven power plants increase at an increasing rate with an increase in the physical size. Both the labor costs and the material costs must be kept to a minimum, and the power plant must be large in size, if it is to be economically attractive to investors. Fabricating the major structural members at ground level will keep labor costs to a minimum, and a high power over mass ratio will allow a large power plant to be financed. The system set forth herein, has provisions for both solutions.

To keep labor costs to a minimum the columns, circular frames and stringers will be fabricated at or near ground level. The columns will be fabricated adjacent to the foundation, and the circular frames will be fabricated above the foundation. For assembly the columns will be pivoted from their horizontal orientation to the vertical, and the circular frames will then be hoisted from their horizontal positions to upright positions at the top of the columns. When the circular frames are in their final positions the stringers will then be hoisted for assembly. The remainder of members will be hoisted for assembly with a minimum of difficulty as construction progresses.

To keep material costs to a minimum high power over mass ratios will be obtained by design. The smallest circular frame and its support columns located in the plane of the power plant throat will be constructed much more ridgedly than the other members, thereby taking most of the thrust in the axial direction. The columns will be stressed evenly by tapering their sections, and will be mounted ridgedly to the foundation. The columns and circular frames will be of rivoted or bolted assemblies.

DETAILED DESCRIPTION OF THE DRAWINGS

Figure 1:
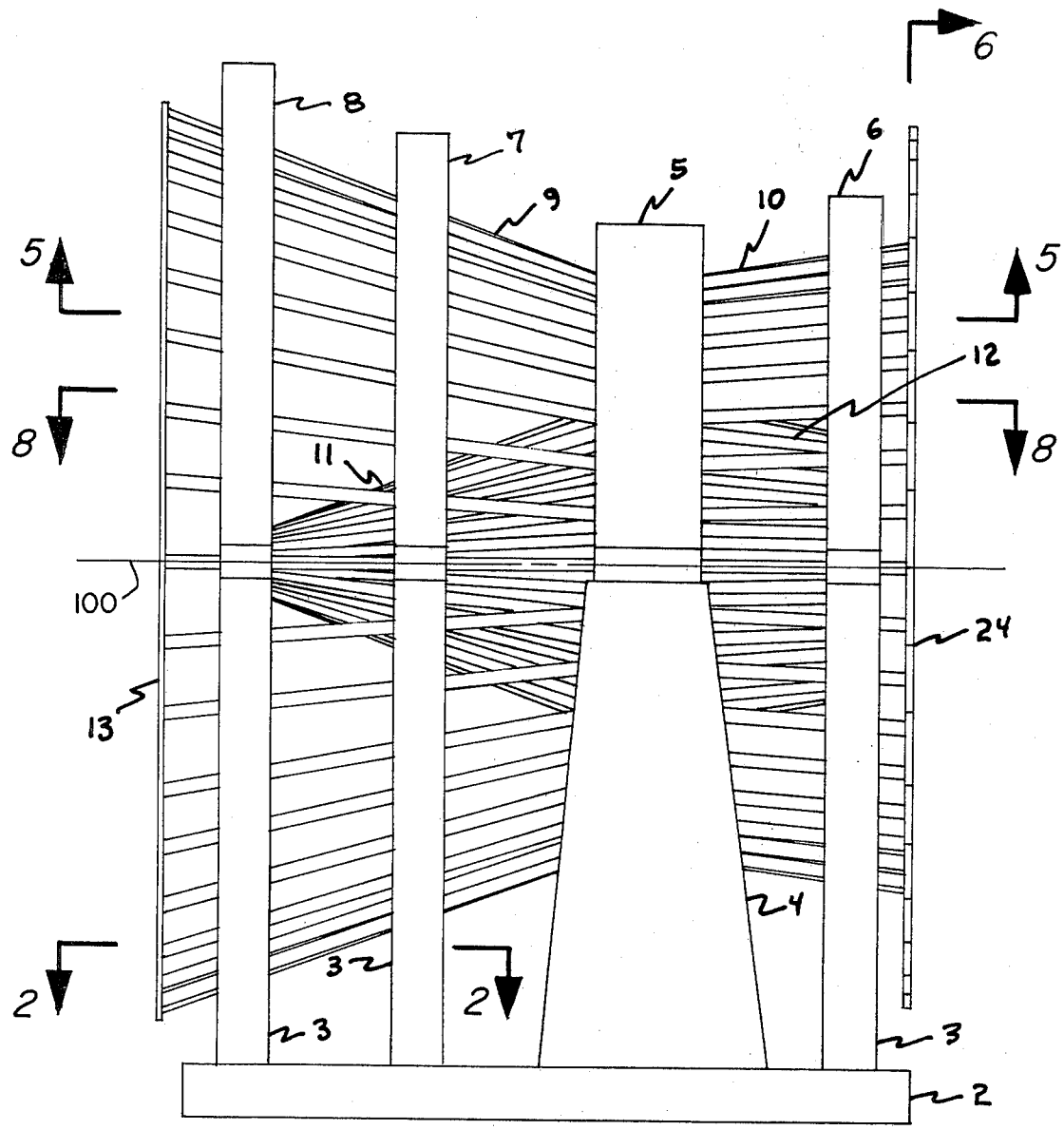
FIG. 1 is a side view correlating the positions of the foundation, columns, circular frames, stringers and stiffeners.

FIG. 1 is a side view of the structural support system 1 sharing the relative position of the system components which include columns 3 and 4 ridgedly attached to the top of a foundation 2. The structural support system 1 defines the structural supports for a Wind Driven Power Plant as described in applicants U.S. Pat. No. 4,411,588, which power plant is defined, in part, by various surfaces of revolution that constitute wind flow controlling and diverting surfaces and which are supported by the herein described structural support system 1. A circular frame 5 is ridgedly attached to the top of the columns 4, and circular frames 6, 7 and 8 are ridgedly attached to the top of the columns 3. The stringers 9 and 11 are ridgedly attached to the circular frames 5, 7 and 8, and stringers 10 and 12 are ridgedly attached to the circular frames 5 and 6 with a stiffener 13 ridgedly attached to the front of the stringers 9 and with stiffeners 24 ridgedly attached to the side of the stringers 10.

Figure 2:
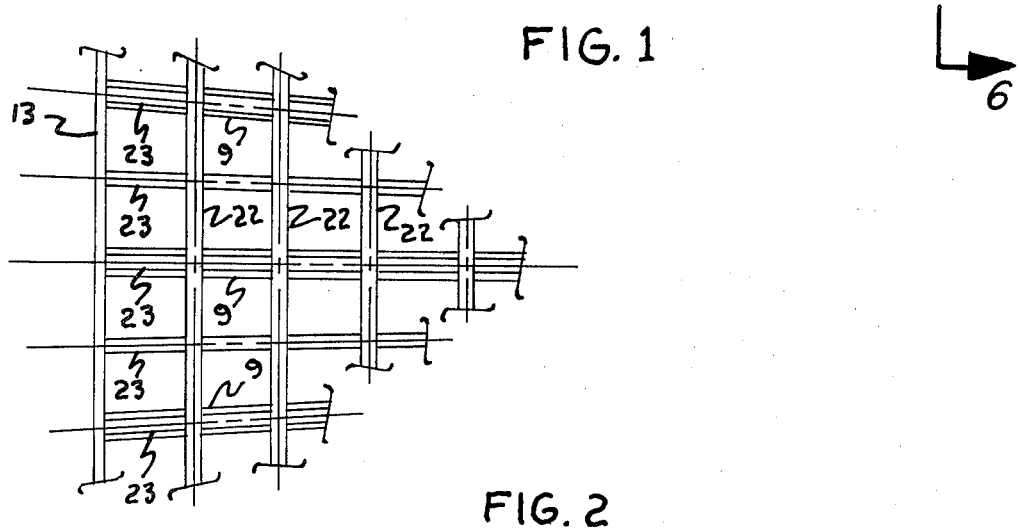
FIG. 2 is a sectional view of FIG. 1 correlating the positions of the stringers and stiffeners.

FIG. 2 is a partial sectional view of FIG. 1 and shows the relative positions of the stringers 9 and the stiffeners 13, 22 and 23. The stiffener 13 is a circular ring and is butted up against the ends of the stringers 9. The stiffeners 22 are circular rings and are ridgedly attached to the sides of the stringers 9. The stiffeners 23 are straight beams and are ridgedly attached to the sides of the stiffeners 13 and 22. The power plant liner, not shown, is ridgedly attached to the inside surface of the stiffeners 13, 22 and 23.

Figure 3:
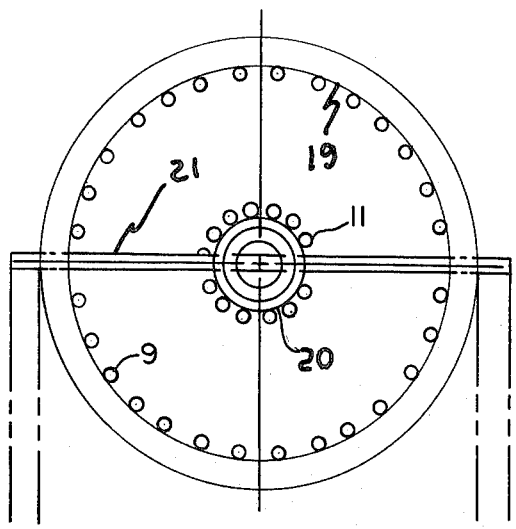
FIG. 3 is a front view of a circular frame.

FIG. 3 is a front view of a circular frame 7 showing the position of its components. The circular frame 7 includes an outer circular ring 19, an inner circular ring 20, and a horizontal beam 21. The circular rings 19 and 20 and the horizontal beam 21 lie in the same plane and have the same center about the major axis 100 of the structure. The horizontal rings 19 and 20 are ridgedly attached to the horizontal beam 21. The horizontal beam 21 is ridgedly attached to the top of the columns 3.

Figure 4:
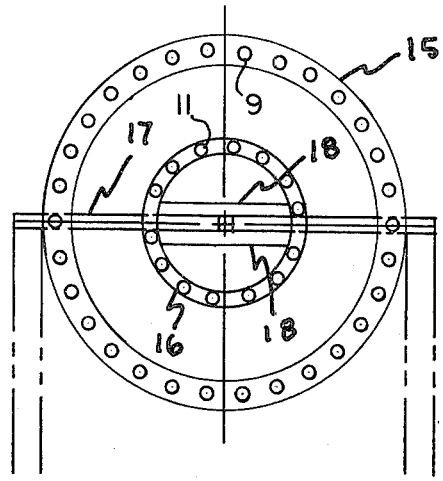
FIG. 4 is a rear view of a circular frame.

FIG. 4 is a rear view of the circular frame 5 showing the position of its components. The circular frame 5 includes an outer ring 15, an inner circular ring 16, a horizontal beam 17, and two stiffeners 18. The circular horizontal beam 17 has a hole at its center for the power plant's turbine shaft, not shown. The stiffeners 18 reinforce the horizontal beam 17. The outer circular ring 15, inner circular ring 16, horizontal beam 17, and stiffeners 18 lie in the same plane and have the same lines of symmetry. The circular rings 15 and 16 and stiffeners 18 are ridgedly attached to the horizontal beam 17 with the horizontal beam 17 being ridgedly attached to the top of the columns 4.

Figure 5:
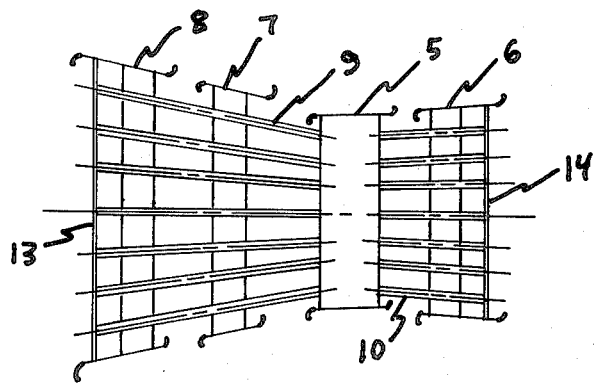
FIG. 5 is a sectional view of FIG. 1 correlating the positions of the stringers, circular fames and stiffeners.

In FIG. 5 is a sectional view of FIG. 1 showing the relative positions of the stringers 9 and 10; the circular frames 5, 6, 7, and 8; and the stiffeners 13 and 14. The stringers 9 are ridgedly attached to the inside circumferential surfaces of the outside circular ring 19 of the circular frames 7 and the outside circular ring of the circular frame 8. The stringers 10 are ridgedly attached to the inside circumferential surface of the outer circular ring of circular frame 6. The rear ends of the stringers 9 are butted up against the front face of the outer circular ring 15 of the circular frame 5 and are ridgedly attached to front face. The front ends of the stringers 10 are butted up against the rear face of the outer circular ring 15 of the circular frame 5 and are ridgedly attached to said rear face. The stiffener 14 is butted up against the rear ends of the stringers 10 and is ridgedly attached to the stringers 10.

Figure 6:
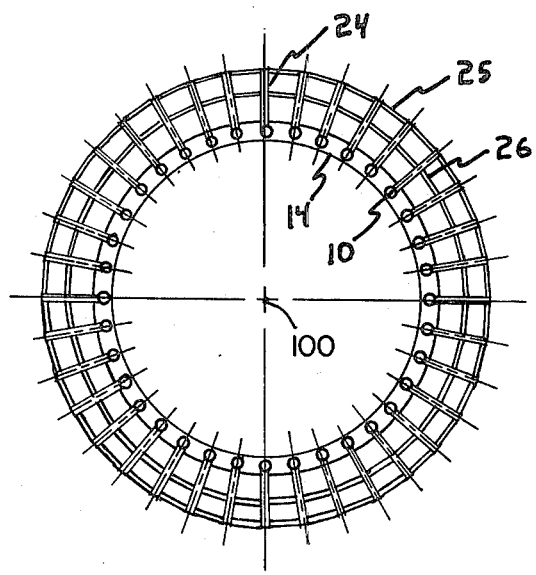
FIG. 6 is a sectional view of FIG. 1 correlating the positions of the stringers and stiffeners.

In FIG. 6 is a sectional view of FIG. 1 showing the relative positions of the stringers 10 and the stiffeners 14, 24, 25, and 26. The stringers 10 circumvent the center of rotation of the power plant's turbine shaft, not shown, and are evenly spaced. The stiffener 14 is a circular ring. The stiffeners 24, 25 and 26 are straight beams. The stiffeners 25 and 26 are ridgedly attached to the sides of the stiffener 24. The fin of the wind driven power plant, not shown, is ridgedly attached to the stiffeners 14, 24, 25 and 26.

Figure 7:
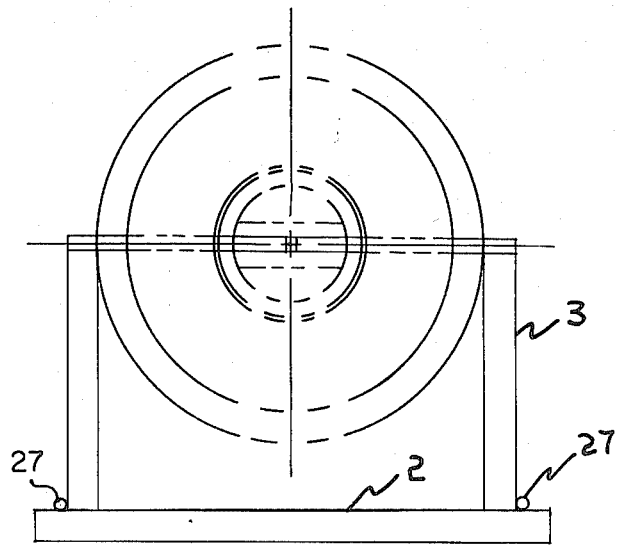
FIG. 7 is a rear view correlating the postions of the foundation, columns and hinges.

FIG. 7 is a rear view of the subject structural system, and illustrates a preferred manner by which the subject structural system may be erected. As shown in FIG. 7, a hinge 27 interconnects the foundation 2 with the columns 3 and 4. The columns 3 and 4 are assembled at ground level, and during construction are lifted to their up right positions. The hinges 27 guide the columns 3 and 4 to their final positions as shown. Only the rear columns 3 are shown in FIG. 7.

Figure 8:
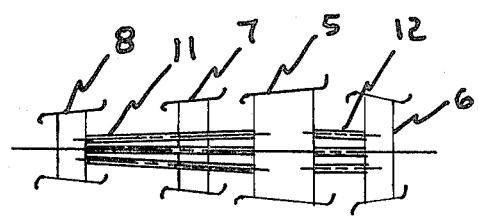
FIG. 8 is a sectional view of FIG. 1 correlating the positions of the circular frames and stringers.

In FIG. 8 is a sectional view of FIG. 1 which shows the relative positions of the stringers 11 and 12 and the circular frames 5, 6, 7, and 8. The stringers 11 are ridgedly attached to the outside circumferential surface of the inner circular ring 20 of the circular frame 7. The front ends of the stringers 11 are butted up against the rear face of the inner circular ring of circular frame 8 and ridgedly attached to said rear face. The rear ends of stringers 11 are butted up against the front face of the inner circular ring 16 of the circular frame 5 and ridgedly attached to said front face. The front ends of the stringers 12 are butted up against the rear face of the inner circular ring 16 of the circular frame 5 and are ridgedly attached to said rear face. The rear ends of the stringers 12 are butted up against the front face of the inner circular ring of circular frame 6 and ridgedly attached to said front face.

The illustrated embodiment can be varied within the scope of the invention. In particular, it is possible to vary the shape of the circular frames, the number and method of attachment for the stringers, circular frames, and stiffeners and the method of attachment for the columns.

Although, a particular embodiment of the invention has been disclosed above for illustrative purposes, it will be understood that variations or modifications thereof which lie within the scope of the appended claims are contemplated.

I claim:

1. A structural support system for a wind driven apparatus, said structural support system comprising:

a plurality of support frames, each frame of which includes an outer support ring and an inner support ring with connecting means connected to and extending between said outer and inner support rings to support said outer and inner support rings coaxial relative to one another, said plural support frames including a forward support frame, a rearward support frame, and an intermediate support frame located between said forward and said rearward support frames;

support column means connected to said support frames to support said support frames relative to a foundation with said support frames coaxial with and spaced along a longitudinal axis of said structural support system;

the outer support ring of said intermediate support frame having a smaller diameter than the outer support rings of said forward and rearward support frames and the inner support ring of said intermediate support frame having a larger diameter than the inner support rings of said forward and rearward support frames;

a plurality of first elongated longitudinally directed stringers connected to and extending between said outer rings and a plurality of second elongated longitudinally directed stringers connected to and extending between said inner support rings of said forward, intermediate, and rearward support rings;

said first-mentioned stringers each subdivided into two portions, a first portion of said first-mentioned support stringers extending between said outer support rings of said forward and intermediate support frames and a second portion extending between the outer support rings of said intermediate and rear support frames, said first portion of said first-mentioned stringers secured to the inside surface of the outer support ring of said forward support frame and also secured to a sidewall face of the outer support ring of said intermediate support frame, and said second portion of said first-mentioned stringers secured to the outer support frame of said rearward support frame at the inside diameter surface thereof and to a sidewall face of the outer support ring of said intermediate support frame; and a plurality of circular stiffeners secured to said first-mentioned stringers and axially spaced relative to one another along said longitudinal axis.

2. The structural support system claimed in claim 1, wherein the forwardly directed ends of said first-mentioned stringers extend forwardly of said forward support frame and further comprising first end stiffener means secured to the forwardly extending ends of said first-mentioned stringers.

3. The structural support system claimed in claim 2 wherein the rearwardly directed ends of said first-mentioned stringers extend in a rearward direction of said support frame and further comprising second end stiffener means secured to the rearwardly extending ends of said first-mentioned stringers.

4. The structural support system claimed in claim 1, wherein said first-mentioned stringers are secured to the inside diameter surface of said outer support rings.

5. The structural support system claimed in claim 1, wherein said second-mentioned stringers are divided into two portions, a first portion of said second-mentioned stringers extending between the inner support ring of said forward frame and the inner support ring of said intermediate frame and a second portion of said second-mentioned stringers extending between the inner support ring of said intermediate support frame and the inner support ring of said rearward support frame.

6. The structural support system claimed in claim 5 wherein said first portions of said second-mentioned stringers are connected to the outside diameter surface of the inner support ring of said forward support frame and to a sidewall face of the inner support ring of said intermediate support frame, and wherein the second portion of said second-mentioned stringers are secured to the outside diameter surface of the inner support ring of said rearward support frame and to a sidewall face of said inner support ring of said intermediate support frame.

7. The structural support system claimed in claim 1, wherein said support column means are pivotally hinged to said foundation means to permit pivoting thereof from a horizontal to a vertical position, said support frames secured to the upper portion of said support column means.

* * * * *